(12) United States Patent
Ehret (10) Patent No.: US 11,297,849 B2
(45) Date of Patent: Apr. 12, 2022

(54) POWDER TRAY (71) Applicant: TREIBER TRAYS COMPOSITES GMBH, Heidelberg (DE)

(72) Inventor: Gunther Ehret, Hirschhorn (DE)

(73) Assignee: TREIBER TRAYS COMPOSITIES GMBH, Heidelberg (DE)

( * ) Notice: Subject to any disclaimer, the term of this patent is extended or adjusted under 35 U.S.C. 154(b) by 0 days.

(21) Appl. No.: 16/471,169

(22) PCT Filed: Apr. 7, 2017

(86) PCT No.: PCT/EP2017/058393
§ 371 (c)(1),
(2) Date: Jun. 19, 2019

(87) PCT Pub. No.: WO2018/114061
PCT Pub. Date: Jun. 28, 2018

(65) Prior Publication Data
US 2019/0387765 A1 Dec. 26, 2019

(30) Foreign Application Priority Data
Dec. 22, 2016 (DE) .......................... 202016107287.5

(51) Int. Cl.
*A23G 3/02* (2006.01)
*B65D 1/34* (2006.01)
*B65D 21/02* (2006.01)

(52) U.S. Cl.
CPC .............. *A23G 3/0268* (2013.01); *B65D 1/34* (2013.01); *B65D 21/0215* (2013.01)

(58) Field of Classification Search
CPC ..... A23G 3/0268; B65D 1/34; B65D 21/0215
See application file for complete search history.

(56) References Cited

U.S. PATENT DOCUMENTS 2,822,106 A 2/1958 Fabian et al.
3,416,704 A 12/1968 Frater
(Continued)

FOREIGN PATENT DOCUMENTS

DE 6931814 1/1970
GB 2217648 11/1989

OTHER PUBLICATIONS

Translated International Preliminary Report on Patentability for International (PCT) Patent Application No. PCT/EP2017/058393, dated Jul. 4, 2019, 7 pages.
(Continued)

*Primary Examiner* — Michael M. Robinson
*Assistant Examiner* — Victoria Bartlett
(74) *Attorney, Agent, or Firm* — Sheridan Ross P.C.

(57) ABSTRACT

Powder tray made of plastics material for the production of confectionery products and comprising a powder tray bottom (2) which has an upper face (3) and a lower face (4), side elements (5) which are interconnected at corner regions and provide side surfaces (14), and powder tray feet (10) which on their lower face form a stand surface (11) and are arranged in the corner regions, wherein the side elements (5) form a powder tray edge (8) which together with the powder tray bottom (2) provide a receiving space (9) for molding powder. The powder tray is characterized in that at least one of the powder tray feet (10) has a first recess (12) which subdivides the powder tray foot into two foot portions (13, 13').

18 Claims, 5 Drawing Sheets

(56) References Cited

U.S. PATENT DOCUMENTS

| | | | |
|---|---|---|---|
| 3,481,502 A | 12/1969 | Slayman | |
| 3,907,111 A | 9/1975 | Levenhagen | |
| 4,458,815 A | 7/1984 | Mollman et al. | |
| 4,991,718 A * | 2/1991 | Withers | A23G 3/0268 |
| | | | 206/511 |
| 5,076,459 A * | 12/1991 | DeHart | B65D 5/4295 |
| | | | 206/511 |
| 6,273,259 B1 * | 8/2001 | Stahl | B65D 21/046 |
| | | | 206/509 |
| 2017/0341810 A1 * | 11/2017 | Banik | B65D 21/0201 |

OTHER PUBLICATIONS

Official Action for German Patent Application No. 202016107287.5, dated Sep. 26, 2017, 3 pages.
International Search Report for International (PCT) Patent Application No. PCT/EP2017/058393, dated Sep. 8, 2017, 2 pages.

* cited by examiner

POWDER TRAY

CROSS REFERENCE TO RELATED APPLICATIONS

This application is a national stage application under 35 U.S.C. 371 and claims the benefit of PCT Application No. PCT/EP2017/058393 having an international filing date of 7 Apr. 2017, which designated the United States, which PCT application claimed the benefit of German Patent Application No. 202016107287.5 filed 22 Dec. 2016, the disclosure of each of which are incorporated herein by reference.

The invention relates to a powder tray of plastics material for the production of confectionery and comprises a powder tray bottom which has an upper face and a lower face, side elements which are interconnected at corner regions and provide side surfaces, and powder tray feet which on their lower face form a stand surface and are arranged in the corner regions, the side elements forming a powder tray edge which together with the powder tray bottom provide a receiving space for molding powder.

Such powder trays are used in the production of confectionery, particularly fruit gums and the like. The production of confectionery involves the so-called starch molding process which is also referred to as the starch mogul system. This is a method of shaping confectionery from pourable masses. The process functions on the expendable mold principle by initially stamping depressions in a layer of powder (starch powder in particular) by means of a stamp. The powder is located in the powder tray. The depression is then filled with the pourable mass. Once the mass has solidified, the powder layer is removed by sieving, for example. The process can be used for the production of various confectionery products, such as jelly, gum, aerated confectionery masses and the like. In particular, it is regularly applied in the production of gummy bears and other molded fruit gums.

In the past, powder trays were mainly manufactured from wood. DD 108648 describes a known powder tray of wood.

In addition, powder trays made of other materials have also been proposed. DE 6931814 U describes a powder tray which is provided in multiple parts, the frame consisting of plastics material and the floor surface of plastics material or sheet metal. U.S. Pat. No. 4,458,815 describes a one-piece powder tray, which is made of cast glass fiber.

In contrast, the object of the invention is to specify a powder tray which allows good handling and simultaneously has high stability and durability.

This object is achieved with the features of claim 1. Accordingly, in the case of the powder tray mentioned initially it is envisaged that at least one of the powder tray feet has a first recess which subdivides the powder tray foot into two foot portions. The first recess contributes to better handling of the powder tray. In particular, it enables better mechanical handling. By means of the first recess which is arranged in the powder tray foot and subdivides the powder tray foot into two portions, the powder tray can be gripped and moved particularly simply by means of a mechanical gripping device. At the same time, good stackability of the powder tray is achieved. The powder tray is also very stable and durable. It can also be manufactured in high quality relatively inexpensively and enables the hygienic production of confectionery products. Furthermore the corner regions may in particular be angular or rounded in design. Preferably, the powder tray feet in all corner regions each have a first recess. The receiving space for the molding powder may in particular be open towards the top. In addition, the molding powder can be incorporated in particular as a layer on the powder tray bottom. During the production of the confectionery, cavities may be formed in the molding powder which are poured out with a fruit gum mass. The molding powder may consist of starch, for example. An additional advantage of the first recess is that the production of confectionery can be improved. Thus, the first recess can enable better air circulation. This is relevant in particular to the production of fruit gums in which a plurality of powder trays are generally stacked in a drying chamber. The first recess may be provided as a ventilation opening for the receiving space. To this end, the first recess is preferably provided as a through-opening which connects the receiving space to the outside. Improved air circulation reduces the drying time of the fruit gum mass introduced into cavities of the molding powder. Productivity in confectionery production can be substantially improved by this means.

An advantageous embodiment provides for the side elements to be formed straight. Preferably two each of the side elements are arranged parallel to one another. In particular, the side elements can each be arranged at right angles to one another.

A particularly preferred embodiment provides for the powder tray to have a rectangular basic form with narrow sides and long sides. Any one of the powder tray feet is preferably arranged in each of the four corner regions.

According to the invention, it may be envisaged that the first recess is open towards one of the side surfaces. In doing so, a gripping recess may be provided into which a gripping tool can be inserted from the side. Mechanical handling in particular can be further improved in this regard. In the case of a powder tray which has a rectangular basic form, the first recess is preferably open towards the side surface of one of the narrow sides. Furthermore, it is preferred that the first recess is open towards the stand surface. The first recess is then open downwards.

According to a further development of this inventive concept, it can be envisaged that the first recess has a maximum length which amounts to at least 5% of a maximum length of the side element in which the first recess is arranged. Preferably the maximum length of the first recess is at least 10% of the maximum length of the side element in which the first recess is arranged. Furthermore, it is preferred that the maximum length of the first recess is less than 25% of the maximum length of the side element in which the first recess is arranged.

An advantageous embodiment of the invention provides for the first recess to have a recess base and two recess side surfaces with at least one of the recess side surfaces being aligned obliquely to the stand surface in such a way that the first recess widens from the recess base to the stand surface of the powder tray foot. In doing so, handling is further improved. In particular, this form of the recess facilitates a simple centering of the powder tray relative to a gripping tool. Preferably, both recess side surfaces are aligned obliquely to the stand surface in such a way that the first recess on both sides widens from the recess base to the stand surface of the powder tray foot.

According to the invention, the two recess side surfaces may each have a straight portion wherein an angle $\alpha$ between the straight portions is between 30° and 60°. Preferably the angle $\alpha$ is between 35° and 55°. This contributes to good mechanical handling.

A particularly preferred embodiment provides for the recess base to be at a distance of more than 10 mm from the stand surface. Preferably, the recess base is between 15 mm and 25 mm away from the stand surface.

Preferably, the recess base comprises a flat surface which is aligned parallel to the stand surface.

An advantageous embodiment of the invention provides for that at least one of the side elements has a second recess in a central region. This further improves handling and enables the powder tray to be gripped particularly easily in the region of the second recess. In the case of a rectangular basic form of the powder tray, the second recess is preferably arranged in one of the narrow sides. Preferably, one of the second recesses is provided in each of the narrow sides. Additionally, the second recess may also contribute to an improvement of the confectionery production. In particular, the second recess may enable better air circulation during the drying of fruit gums. The second recess may here be provided as a ventilation opening for the receiving space. In particular, the second recess may be provided as a through-opening which connects the receiving space to the outside.

Furthermore, it may be advantageously provided that the second recess is arranged between two of the powder tray feet which border the second recess.

Advantageously, it may be provided that the second recess is open towards the stand surface and the side surface. Preferably, the second recess is open towards the same side surface to which the first recess of an adjacent powder tray foot is open. Preferably the second recess is open towards the side surface of the side element in which the second recess is arranged.

A particularly preferred embodiment provides for the second recess to be of a maximum length of between 10% and 60% of the maximum length of the side element in which the second recess is arranged. Preferably, the aforementioned maximum length of the second recess is between 30% and 55% of the maximum length of the side element.

Furthermore, in the case of a rectangular basic form of the powder tray it is preferred for the first recess and the second recess to be arranged on the narrow sides.

An advantageous embodiment of the invention provides for at least one of the side elements to have a third recess in a central region. In the case of a rectangular basic form of the powder tray, the third recess is preferably arranged in one of the narrow sides. In a particularly preferred manner, a third recess is arranged in each of the narrow sides. The third recess contributes to improved handling of the powder tray. In addition, it reduces the weight. According to the invention, a third recess may also be provided even if no second recess is provided. However, for the invention it is preferable if second and third recesses are provided in addition to the first recess.

Advantageously, the third recess is arranged so that it is open to the side surface and to an upper face of the side element in which the third recess is arranged.

A preferred embodiment provides for the third recess to be bounded by a portion of the side element which is formed as a sliding surface, the sliding surface being arranged obliquely to the powder tray bottom. This contributes to improved handling and causes surplus molding powder to slide away along the sliding surface. Preferably, there is an angle $\beta$ of between 30° and 70° between the sliding surface and the powder trade floor. Particularly preferably, the angle $\beta$ is between 40° and 60°. In particular, the sliding surface may be an even surface. Furthermore the sliding surface can be arranged in such a way that it slopes down towards the outside.

In an advantageous embodiment, it may be provided that the third recess extends across at least 50% of a thickness of the side element. This thickness in one direction may be measured perpendicularly to the longitudinal direction of the side element.

It may further be envisaged that the third recess extends over a maximum length which comprises at least 10% of a maximum length of the side element in which the third recess is arranged. Preferably, the third recess extends over less than 60% of the maximum length of the side element in which it is arranged. Particularly preferably, the third recess extends over between 20% and 50% of the maximum length of the side element in which the third recess is arranged.

Advantageously, it may be envisaged that supports are arranged in a central region of two of the mutually opposing side elements. In the case of a rectangular basic form of the powder tray, the supports may be arranged in or on the side elements which form the long sides. The supports not only prevent bending, but also improve handling.

According to the invention, it is preferred that the powder tray bottom, the side portions and the powder tray feet consist of cross-linked plastics material, particularly a thermosetting polymer. Preferably, the entire powder tray consists of cross-linked plastics material. In particular, the powder tray may be provided in one piece.

Advantageously, the powder tray can be obtained by placing a semi-finished blank of a cross-linkable plastics material into a cavity of a mold which is cured in the cavity under pressure after the mold is closed, wherein the plastics material becomes cross-linked. In particular the powder tray may be manufactured by the sheet molding compound process (SMC process). Preferably, the powder tray comprises a single piece wherein the powder tray bottom, side elements and powder tray feet are manufactured in the mold cohesively and of a uniform material.

Preferably, the plastics material has fibers which strengthen the material. In particular, glass fiber may be used.

An advantageous embodiment of the invention provides for the powder tray to be formed in such a way that it can be put together with one or a plurality of conformably formed other powder trays to form a powder tray stack. To do this, the side elements may have support surfaces for the powder tray feet. Preferably, the support surfaces for the powder tray feet are arranged in the corner regions. Preferably, a support surface is provided for each of the powder tray feet. In particular, the support surface is arranged on the upper face of the side elements.

A further improvement in handling is achieved if at least one of the support surfaces is combined with a guide surface which extends upwards from the support surface. Preferably, the guide surface is provided as a centering surface which positions two powder trays during stacking. For this the guide surface can be aligned at an angle $\gamma$ of between 100% and 160% to the support surface. Preferably, the angle $\gamma$ is between 115° and 145°.

Preferably, reinforcing ribs are molded on the lower face of the powder tray bottom. In particular, the powder tray bottom may have a thickness of between 1 mm and 3 mm without the reinforcing ribs.

Preferably, the side elements may have a thickness of between 10 mm and 30 mm. The aforementioned thickness is preferably between 15 mm and 25 mm.

The thickness here may be measured in a direction perpendicular to a longitudinal direction of the side element.

A preferred embodiment provides for the powder tray to be formed mirror-symmetrically, both in respect of a longitudinal mid-axis and of a transversal mid-axis of the powder tray.

It is further preferred for the powder tray edge is formed to be circumferential.

When the terms "above" and "below" are used in the document at hand, they are intended to refer to the orientation of the powder tray during the production of confectionery when molding powder can be provided on the powder tray bottom.

The invention also relates to a use of the described powder tray for the production of confectionery. In particular, the powder tray is suitable for the production of fruit gums. During confectionery production a molding powder, consisting of starch for example, may be arranged on the powder tray bottom. During production, cavities in the molding powder may then be created with a stamp. The cavities may be filled with fruit gum mass.

Other objectives, features, advantages and possible uses of the present invention result from the following description of embodiments by reference to the drawings. All the features which are described and/or illustrated form the subject matter of the invention in their own right or in any meaningful combination, even irrespective of the combination in individual claims or dependency references thereof.

In the drawings:

FIG. 8d: an enlarged detail D from FIG. 8a.

The figures show different views of a powder tray 1 for confectionery production. The powder tray 1 comprises a powder tray bottom 2 which has an upper face 3 and a lower face 4. Furthermore, the powder tray 1 comprises side elements 5 which form the side surfaces 14. In the illustrated embodiment, four side elements 5 are provided which are each formed straight and arranged at right angles to one another. The powder tray 1 has a rectangular basic form with two narrow sides 6 and two long sides 7. The narrow sides 6 are arranged parallel to one another. Additionally, the long sides 7 are arranged parallel to one another. Each two adjacent side elements 5 are interconnected in the corner regions.

Figures 1, 2:
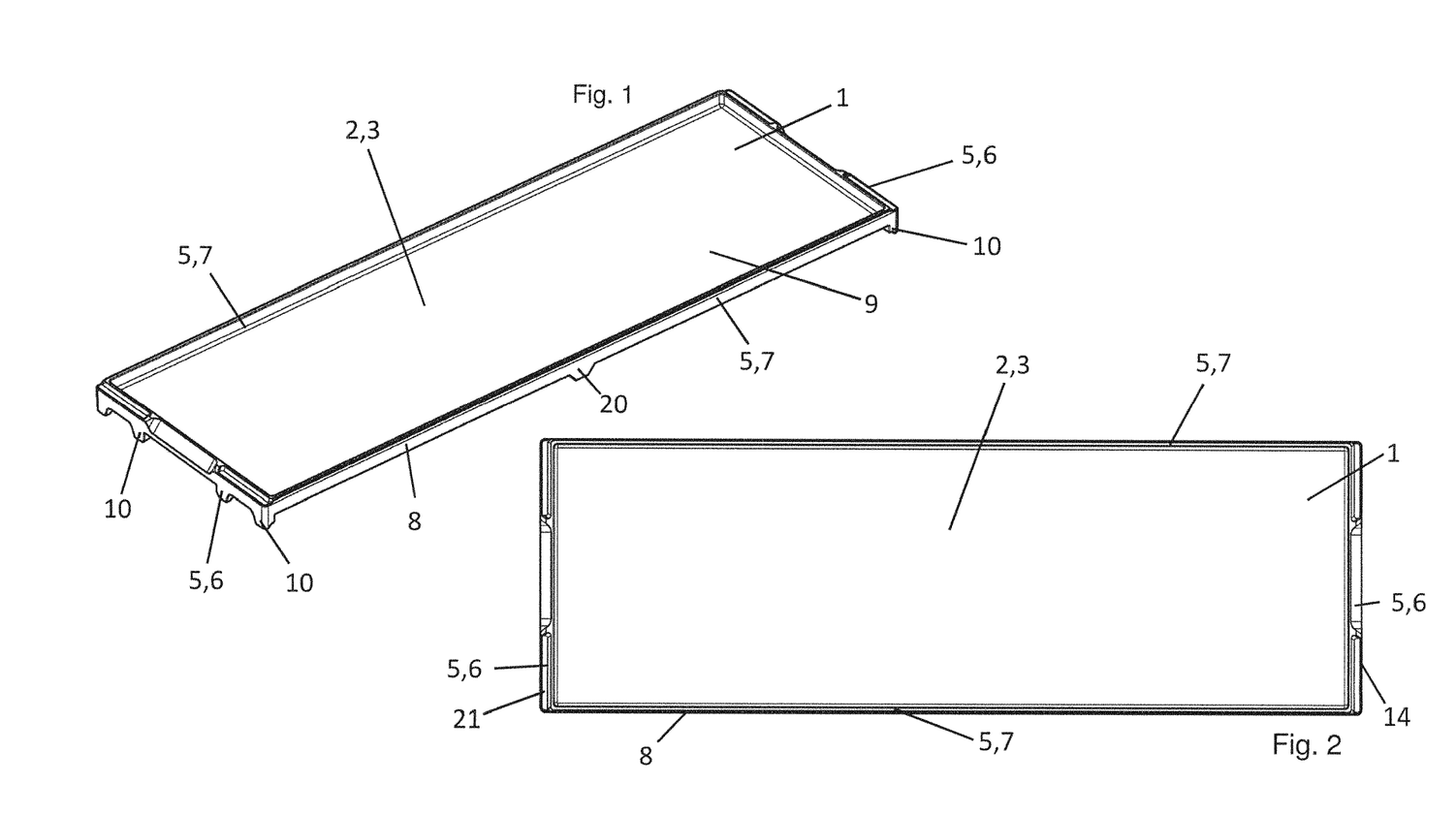
FIG. 1: a perspective illustration of a powder tray according to the invention.
FIG. 2: a top view from above of the powder tray from FIG. 1.
Figure 2A:
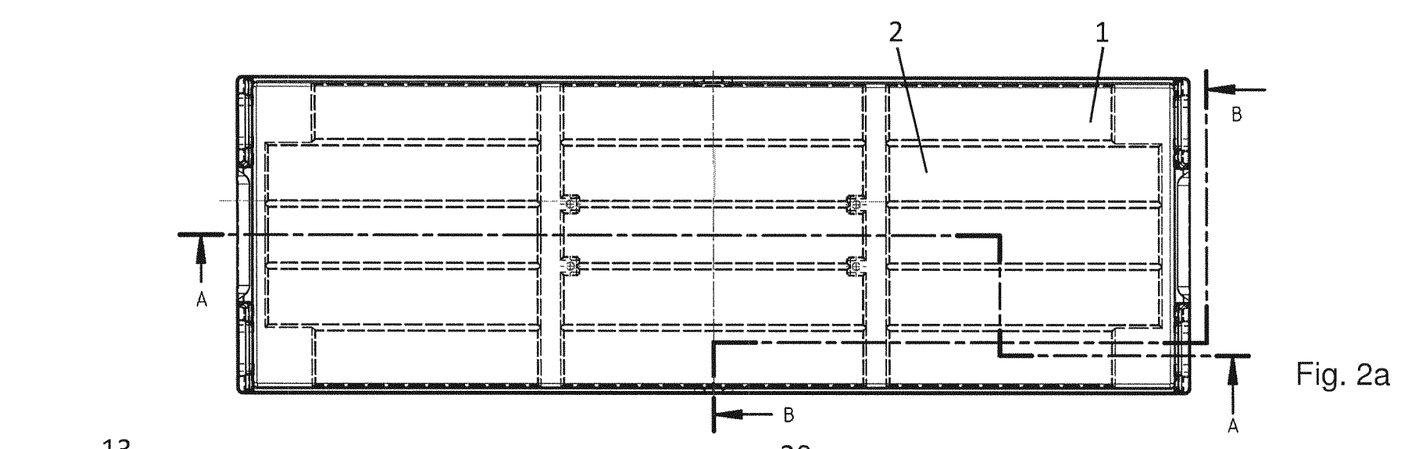
FIG. 2a: a top view from above of the powder tray from FIG. 1, where the ribs attached to the lower face are shown as a broken line.

The side elements 5 form a powder tray edge 8, which encloses the powder tray bottom 2. The powder tray edge 8 is formed circumferentially. As can be seen particularly in FIGS. 1 and 4, the powder tray edge 8 and powder tray bottom 2 comprise a receiving space 9 for molding powder which is open to above (not shown).

Figure 5:
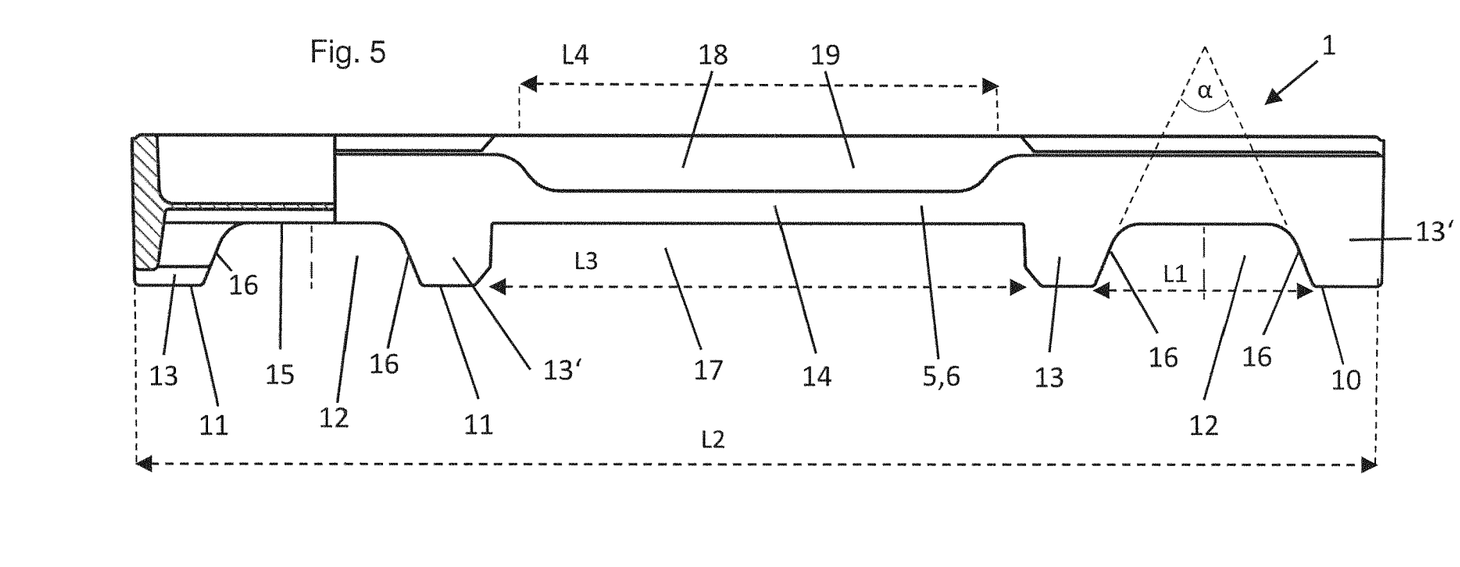
FIG. 5: a view in partial cross-section through the powder tray from FIG. 2a along line B-B.

The powder tray 1 has four powder tray feet 10 which are arranged in the four corner regions. On the lower face, the powder tray feet 10 comprise a stand surface 11. FIG. 5 in particular makes it easily recognizable that the powder tray feet 10 each have a first recess 12 which subdivides said powder tray feet 10 into two foot portions 13, 13' respectively. Here, the first recess 12 is open towards a side surface 14. FIG. 5 in particular makes it obvious that the first recess 12 is open towards the side surface 14 of the narrow side 6. In addition, the first recess 12 is open towards the stand surface 11, thus open to below.

The first recess 12 has a maximum length L1 which is between 10% and 25% of the maximum length L2 of the side element 5 in which the first recess 12 is arranged. The first recess 12 has a recess base 15 and two recess side surfaces 16. The recess side surfaces 16 here are arranged obliquely to the stand surface 11, so that the first recess 12 widens from the recess base 15 towards the stand surface 11 of the powder tray foot 10. FIG. 5 in particular makes it easily recognizable that the two recess side surfaces 16 each have a straight portion. The angle α formed between the straight portions is between 30° and 60° and preferably between 35° and 55°. FIG. 5 further makes it easily recognizable that the recess base 15 forms a flat surface which is aligned parallel to the stand surface 11. Here, the recess base 15 is at a distance between 15 mm and 25 mm away from the stand surface 11.

The side elements 5 of the narrow sides 6 additionally have a second recess 17 in a central region. As shown, a second recess 17 is provided in each of the narrow sides 6. The second recess 17 is arranged between two of the powder tray feet 10. The second recess 17 is open towards the stand surface 11 and the side surface 14 of the side element 5, in which the second recess 17 is arranged. This is particularly easily recognized in FIG. 5. The second recess 17 has a maximum length L3 which is between 10% and 60% of the maximum length L2 of the side element 5.

The first and second recess 12, 17 facilitate improved air circulation. As shown, the first and the second recess 12, 17 are formed as through-openings, which each connect the receiving space 9 to the outside. The first and second recess 12, 17 therefore form ventilation openings for the receiving space.

The figures further show that a third recess 18 is arranged in a central region of the side elements 5. In the shown embodiment, a third recess 18 is arranged in each of the narrow sides 6. The third recess 18 is open towards the side surface 14 of the side element 5 in which it is arranged, and to the upper face of the side element 5. In doing so, the third recess 18 has a different orientation than the first and the second recess 12, 17 which are open to below.

Figures 6, 7:
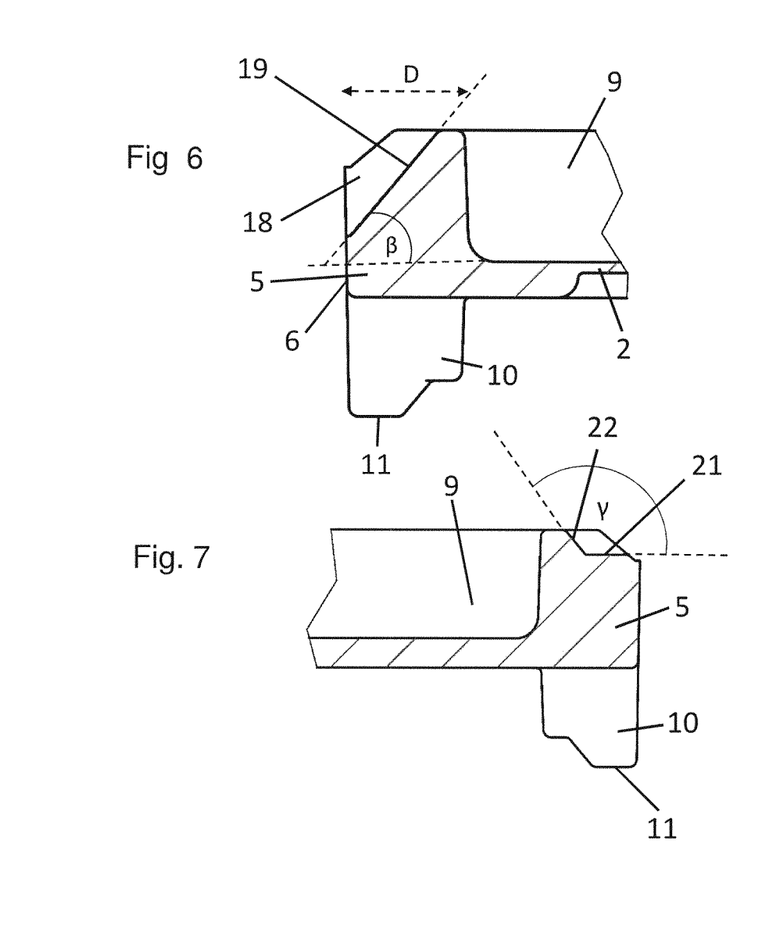
FIG. 6: an enlarged detail D of the powder tray from FIG. 4.
FIG. 7: an enlarged detail C of the powder tray in FIG. 4.
Figure 8A:
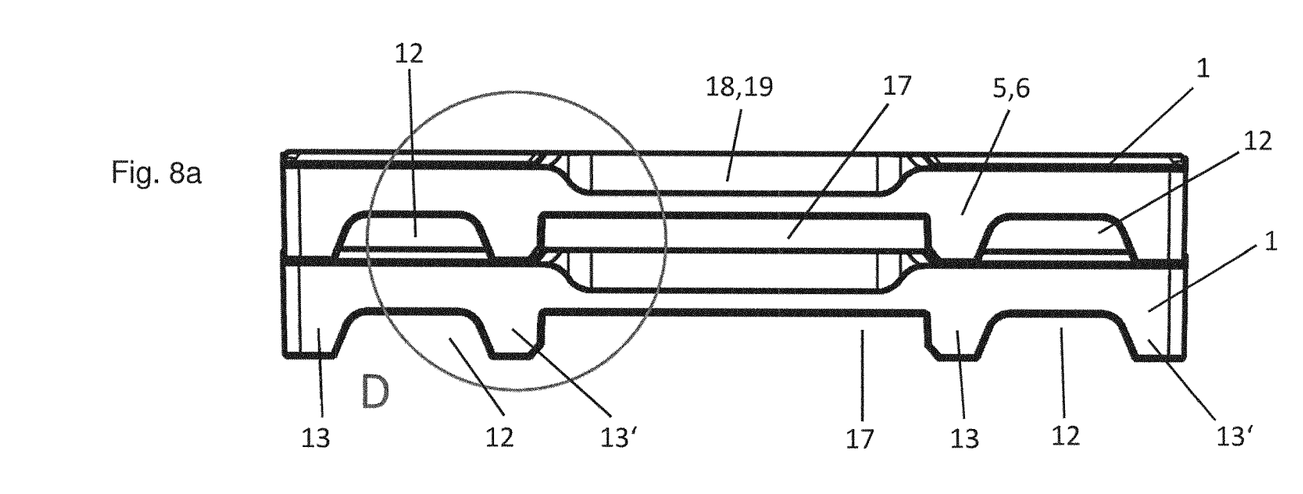
FIG. 8a: two stacked powder trays from FIG. 1 from the narrow side.
Figure 8B:
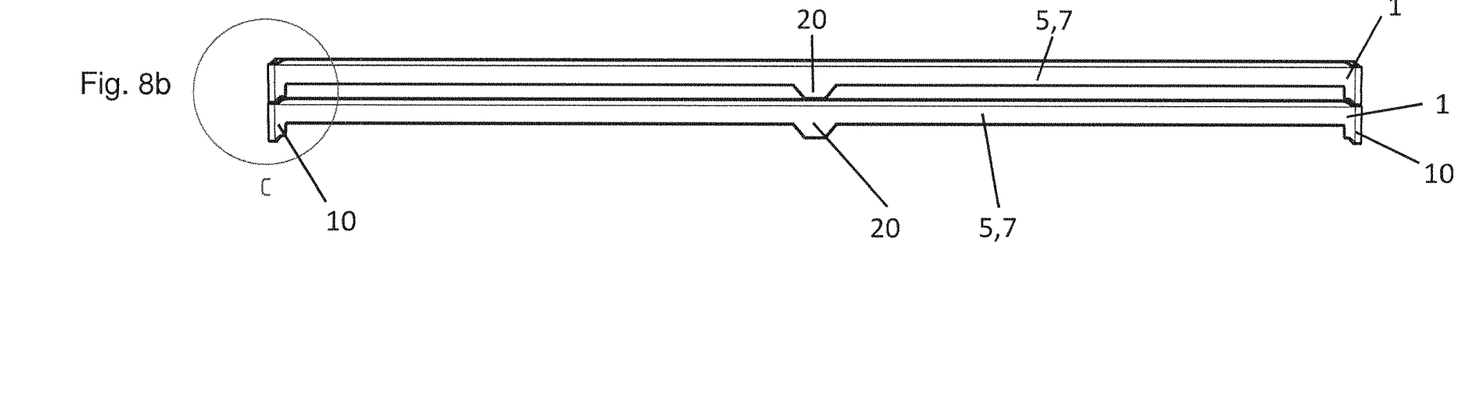
FIG. 8b: the powder trays from FIG. 8a from the long side.
Figure 8C:
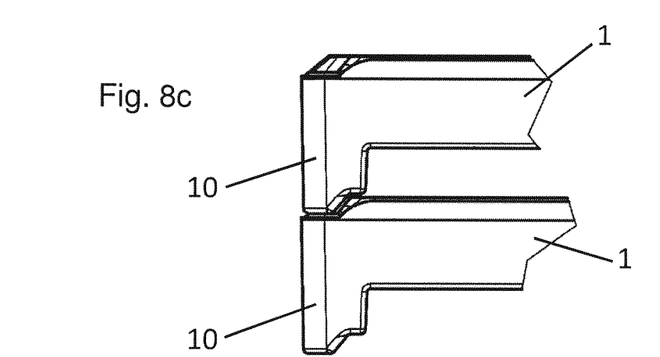
FIG. 8c: an enlarged detail C from FIG. 8b.
Figure 8D:
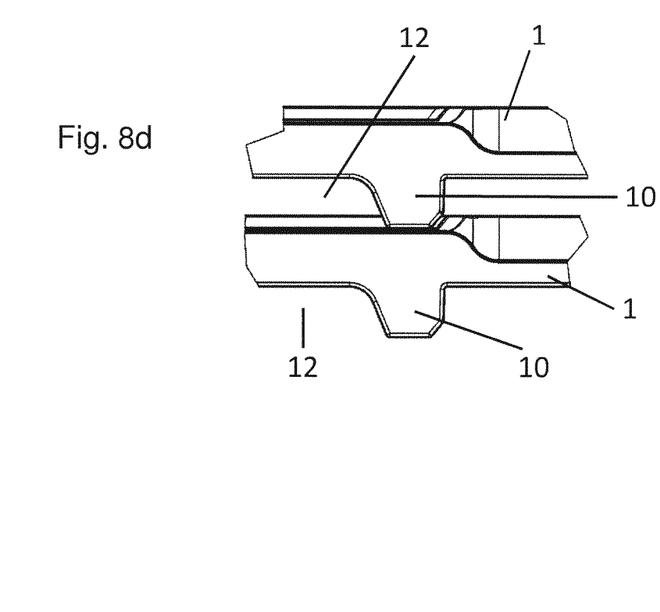

The third recess 18 is bounded by a portion of the side element 5, which is provided as a sliding surface 19. This can be well seen in FIG. 6 in particular. As shown, the sliding surface 19 is arranged obliquely to the powder tray bottom 2, with the sliding surface 19 sloping downwards to the outside. An angle β between the sliding surface 19 and the plane formed by the powder tray bottom 2 is between 30° and 70°, with a value of 40° to 60° being preferred.

The third recess 18 extends over at least 50% of a thickness D of the side element 5 in which it is arranged. In the shown embodiment, the side surface extends over 75% of the thickness D of the side element 5.

The third recess 18 has a maximum length L4 which is at least 10% of a maximum length L2 of the side element 5 in which the third recess 18 is arranged. In the shown embodiment, the third recess 18 extends over about 35% of the length L2.

Figure 4:
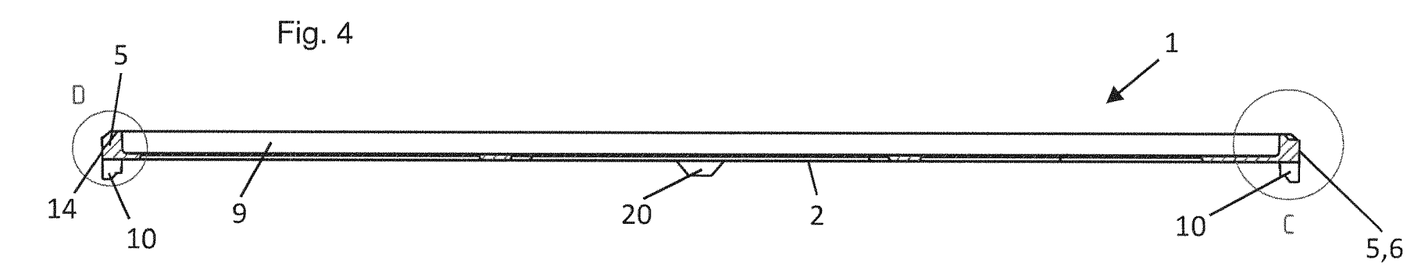
FIG. 4: a cross-section through the powder tray from FIG. 2a along line A-A.

FIG. 4 clearly shows that supports 20 which extend downwards from the side element 5 are arranged in a central region of two long sides 7.

The powder tray 1 can be put together with further conformably formed powder trays 1 to form a powder tray stack. This is shown in FIGS. 8a to 8d in which two superimposed powder trays 1 are shown by way of example. Here, it is possible to stack a larger number of powder trays 1 on top of one another as well. To ensure that the powder trays 1 form a stable stack, the powder tray edge 8 has a support surface 21 for the powder tray feet 10. In the shown embodiment, a support surface 21 is provided for each of the powder tray feet 10. The support surface 21 can be particularly easily seen in FIG. 7. Here it is illustrated that the support surface 21 is combined with a guide surface 22 each which allows a centering of the stacked powder trays 1. The guide surface 22 can be arranged at an angle γ of between 100° and 160° to the support surface 21. Preferably the angle γ is between 115° and 145°.

Figure 3:
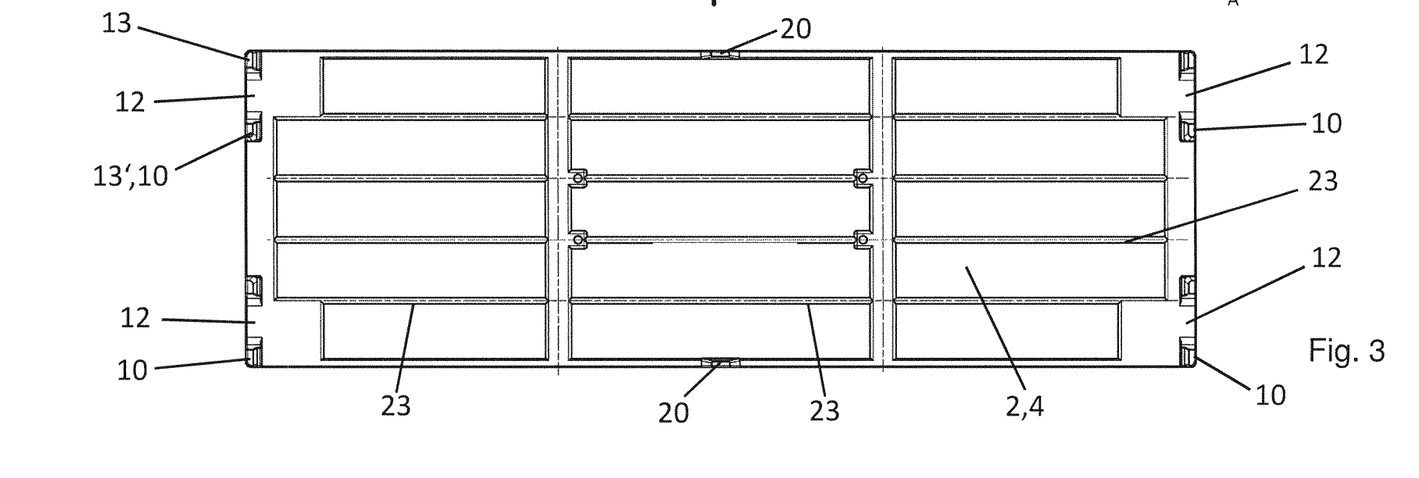
FIG. 3: a top view from below of the powder tray from FIG. 1.

Reinforcing ribs 23 are provided on the lower face of the powder tray bottom 2. This can be seen particularly easily in FIG. 3. In doing so, good stability may be achieved even if the powder tray bottom only has a thickness of between 1 mm and 3 mm without including the reinforcing ribs 23. The thickness D of the side elements 5 is preferably between 10 mm and 30 mm.

The entire powder tray 1 consists of a cross-linked plastics material, in particular a thermosetting plastic. The plastics material is reinforced with glass fiber. The powder tray 1 may be manufactured by the sheet molding compound process (SMC) in particular. For this, a semi-finished blank is first provided in a cross-linkable plastics material. The semi-finished blank is inserted into the cavity of a mold which matches the shape of the powder tray 1. The mold is then closed, whereby the plastics material fills the cavity of the mold before curing within the mold. During curing, the plastics material becomes cross-linked. When the mold is opened, the finished powder tray 1 can be removed.

What is claimed is:

1. A powder tray made of plastics material for the production of confectionery and comprising a powder tray bottom which has an upper face and a lower face, side elements which are interconnected at corner regions and provide side surfaces, wherein the side elements form a powder tray edge which together with the powder tray bottom provide a receiving space for molding powder, and a plurality of powder tray feet which on their lower face form a stand surface, at least one of the powder tray feet having an interior surface and an exterior surface separated by the lower face, and a first recess extending from the interior surface to the exterior surface which subdivides the at least one powder tray foot into a first foot portion and a second foot portion, wherein the first recess has a recess base and two recess side surfaces, wherein at least one of the recess side surfaces is aligned obliquely to the stand surface in such a way that the first recess widens from the recess base to the stand surface of the powder tray foot, and wherein the first foot portion of the at least one powder tray foot is located directly below one of the corner regions.

2. The powder tray according to claim 1, wherein the powder tray has a rectangular basic form with narrow sides and long sides.

3. The powder tray according to claim 1, wherein the first recess is open to one of the side surfaces.

4. The powder tray according to claim 1, wherein the first recess has a maximum length which amounts to at least 5% of a maximum length of the side element in which the first recess is arranged.

5. The powder tray according to claim 1, wherein the two recess side surfaces each have a straight portion wherein an angle of between 30° and 60° is formed between the straight portions.

6. The powder tray according to claim 1, wherein at least one of the side elements has a second recess in a central region.

7. The powder tray according to claim 6, wherein the second recess is open towards the stand surface and towards the side surface.

8. The powder tray according to claim 6, wherein the second recess has a maximum length which is between 10% and 60% of the maximum length of the side element in which the second recess is provided.

9. The powder tray according to claim 1, wherein at least one of the side elements has a third recess in a central region.

10. The powder tray according to claim 9, wherein the third recess is open towards the side surface and an upper face of the side element in which it is provided.

11. The powder tray according to claim 9, wherein the third recess is bounded by a portion of the side element formed as a sliding surface, wherein the sliding surface is arranged obliquely to the powder tray bottom.

12. The powder tray according to claim 9, wherein the third recess extends across at least 50% of a thickness of the side element.

13. The powder tray according to claim 9, wherein the third recess has a maximum length which comprises at least 10% of a maximum length of the side element in which the third recess is arranged.

14. The powder tray according to claim 1, wherein the powder tray is obtainable by placing a semi-finished blank of a cross-linkable plastics material in the cavity of a mold, and after closing the mold curing it under pressure in the cavity in such a way that the plastics material becomes cross-linked.

15. The powder tray according to claim 1, wherein the powder tray is provided in such a way that it can be put together with one or a plurality of conformably formed other powder trays to form a powder tray stack and wherein at least one through opening is formed between each receiving space and the exterior of the powder tray stack through at least one first recess.

16. The powder tray according to claim 1, wherein at least one of the side portions has a support surface for one of the powder tray feet and in that the support surface is combined with a guide surface which extends upwards from the support surface.

17. The powder tray of claim 1, wherein there are at least eight total foot portions.

18. Use of a powder tray according to claim 1 for the production of confectionery.

* * * * *